May 19, 1959        K. POLASEK        2,887,645
CONTROL SYSTEM FOR CONSTANT FREQUENCY INDUCTION ALTERNATOR
Filed Oct. 29, 1956        4 Sheets-Sheet 1
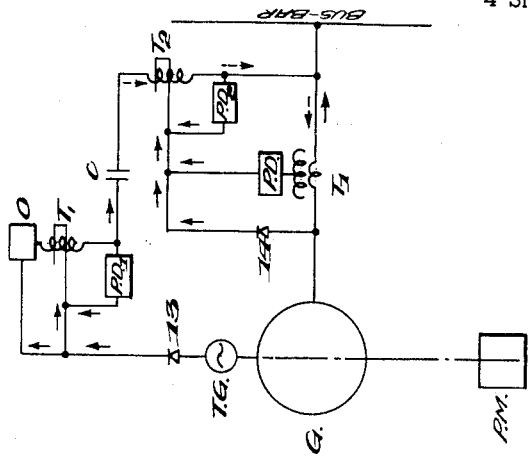
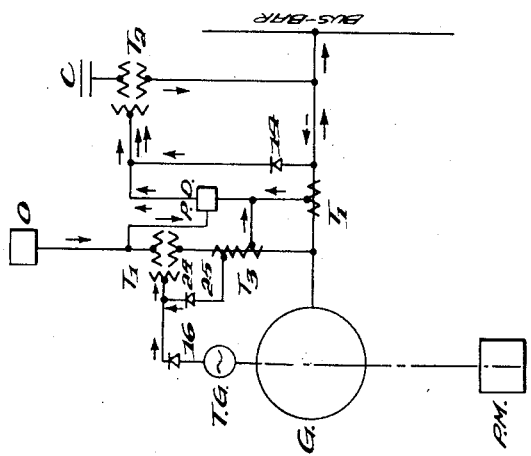
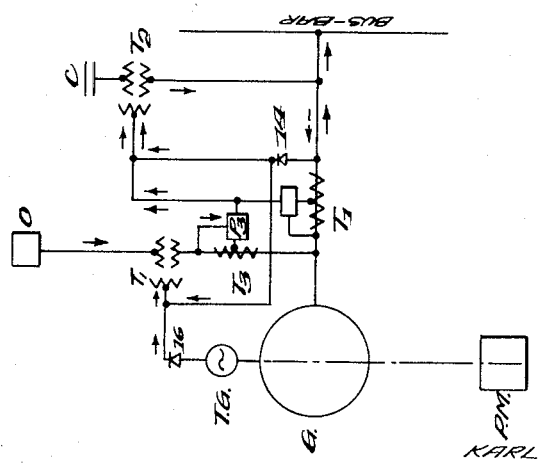
INVENTOR
KARL POLASEK,
BY *Larson and Taylor*
ATTORNEYS

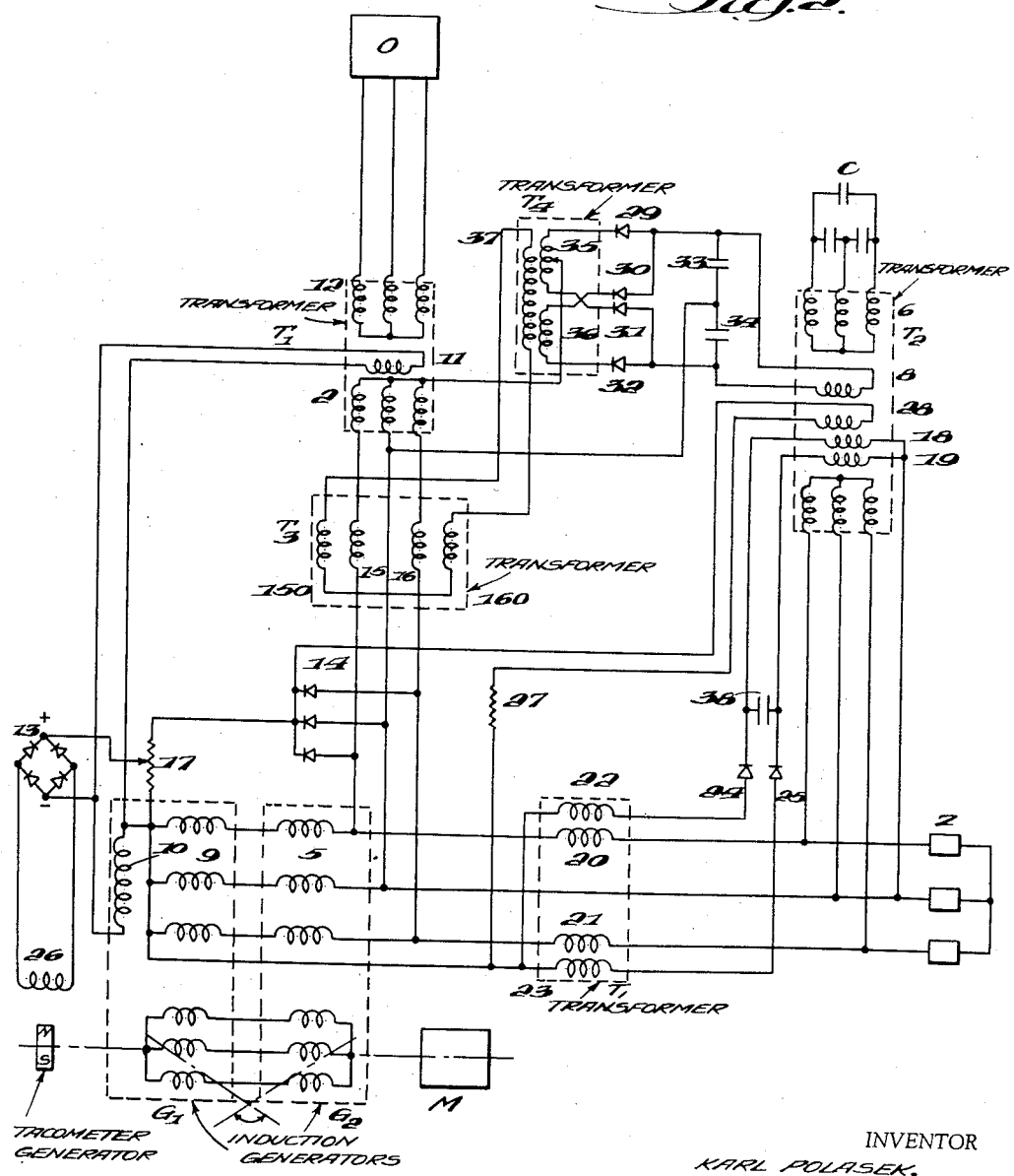

INVENTOR
KARL POLASEK,
BY Larson and Taylor
ATTORNEYS

United States Patent Office 2,887,645
Patented May 19, 1959

2,887,645

CONTROL SYSTEM FOR CONSTANT FREQUENCY INDUCTION ALTERNATOR

Karl Polasek, Bromma, Sweden, assignor to Aero Material AB, Stockholm, Sweden, a corporation of Sweden Application October 29, 1956, Serial No. 619,000

5 Claims. (Cl. 322—31)

This invention relates to a system for frequency and voltage control of an induction alternator particularly according to a prior application Serial No. 553,346 filed on December 15, 1955.

The object of the invention is a very fast and minute control under varying speed and load by control means which are completely free of movable parts and sliding contacts. Another object is establishing of a high grade of protection for the frequency and voltage control against violent changes of speed and load.

Figure 4:
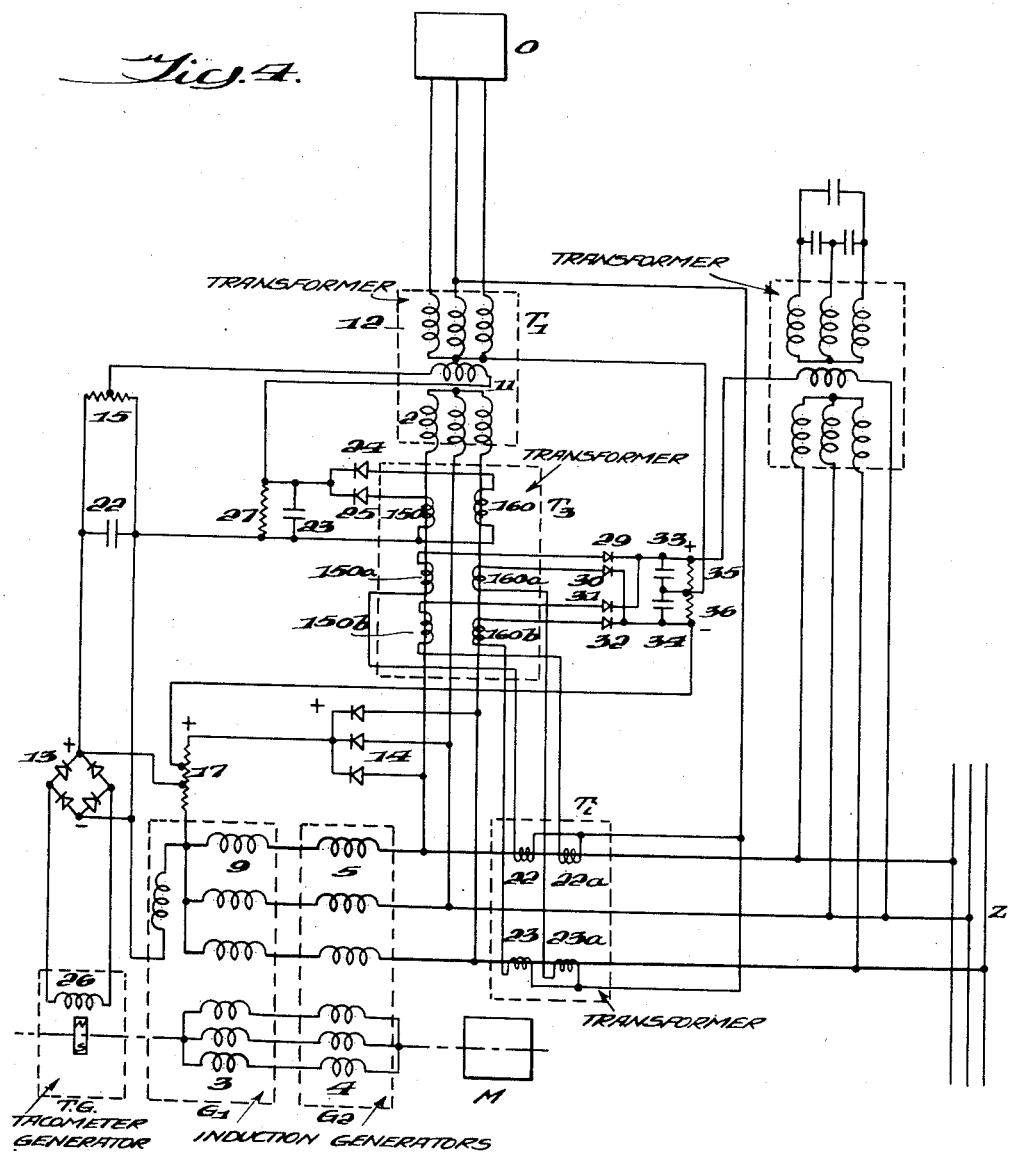
Figure 6:
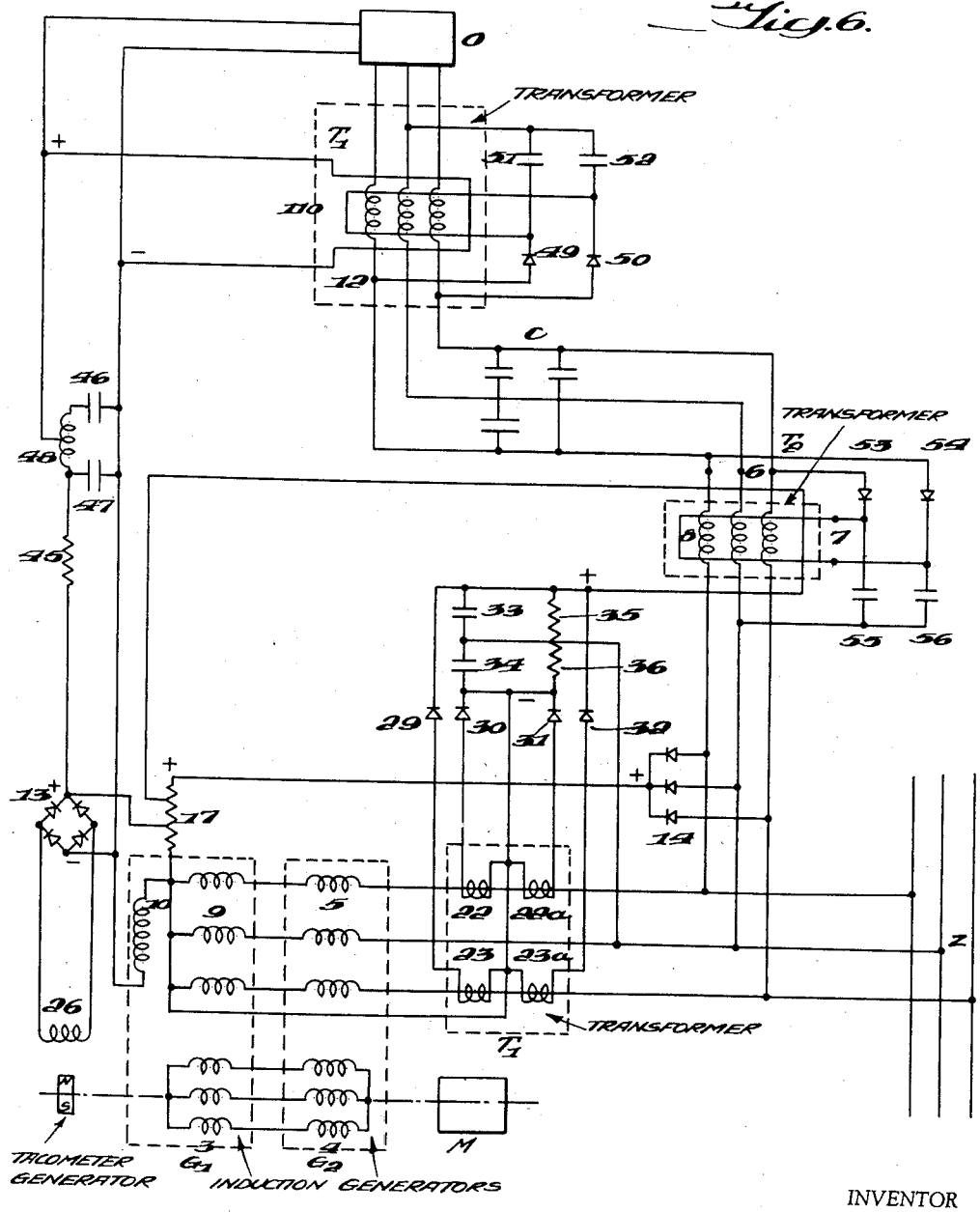

Other objects and attendant advantages of the invention will become more fully apparent upon consideration of the accompanying detailed specification when taken in connection with the drawings wherein:

Fig. 1 shows a basic arrangement of an alternator together with the control equipment according to the invention, Fig. 2 shows a complete wiring diagram, Fig. 3 shows a modification of a basic arrangement of an alternator and control equipment according to the invention, Fig. 4 shows a complete wiring diagram of the modification, Fig. 5 shows another modification of a basic arrangement, Fig. 6 shows a complete wiring diagram of last-mentioned modification.

In Fig. 1 P.M. is a prime mover which drives the rotors of an alternator G. A small A.C. tachometer-generator T.G. is mounted on the same shaft as said rotor. A constant frequency feeder, represented by an oscillator O, is connected to the alternator terminals via a saturable transformer T1 and a current transformer T3.

A condenser bank C is connected to a bus-bar 7 of the system via a saturable transformer T2. Between this point of the system and the alternator a current transformer T$i$ is connected. A voltage proportional to the alternator current is supplied by the transformer T$i$ to a phase sensing device P$i$ together with the alternator voltage. The resultant voltage is rectified and fed into a first presaturating winding of the transformer T2. A voltage proportional to the control current between the transformer T1 and the alternator is supplied by the transformer T3 to a phase sensing device P3 together with the oscillator voltage. The control current varies greatly by changes of line voltage or line frequency. The resultant voltage is rectified and fed into a second presaturating winding of the transformer T2. Finally the alternator voltage is rectified by a rectifier 14 and fed into a third presaturating winding of the transformer T2.

The output voltage of the tachometer-generator is rectified by a rectifier 13 and fed together with an appropriate portion of the rectified alternator voltage into a presaturating winding of transformer T1.

The complete wiring diagram in Fig. 2 shows further details. The alternator consists of two induction machines G1 and G2 with rotor windings 3 and 4 and stator windings 5 and 9. The stators are rotated against each other by a specific angle in order to obtain the required phase displacement between the two rotor voltages. The stator of the machine G1 contains a presaturating winding 10 that allows for a variation of the mutual inductance between stator winding 9 and rotor winding 3. The presaturating winding 10 is fed with the differential voltage of the tachometer voltage generated in its stator winding 26 and rectified by the rectifier 13 and an appropriate portion of the line voltage, rectified by the rectifier 14, and tapped from a potentiometer 17. The amount of presaturation varies with rotor speed and gives an automatic voltage compensation. Presaturating winding 11 of the transformer T1 is connected in parallel to winding 10 and is supplied with the same differential voltage.

The transformer T$i$ has primary windings 20 and 21 in two phases. Its secondary windings 22 and 23 are star connected, the star point being connected with the alternator star point. Windings 22 and 23 supply their output voltage through rectifiers 24 and 25 to two symmetrical halves 18 and 19 of the first saturating winding in the transformer T2. A smoothing condenser 38 is connected across the winding halves 18 and 19. The midpoint of these windings 18 and 19 is connected to the third phase of the system. Its voltage is phase reference voltage for the voltage in the windings 22 and 23. The current in the windings 18 and 19 varies in magnitude and polarity with the flow of energy to or from the generator. This arrangement represents the phase discriminator P$i$. The third presaturating winding 28 in transformer T2 is supplied with line voltage through the rectifier 14 and an adjustable resistance 27 with a current proportional to the line voltage. The polarity is such that together with the windings 18 and 19 a flow of energy from the alternator to the bus-bar increases the presaturation and herewith the coupling between primary windings 6 and secondary windings 7 of the transformer T2. A flow of energy from the bus-bar respectively transformer T2 to alternator decreases the presaturation and causes a looser coupling in the transformer T2.

The transformer T3 has primary windings 15 and 16 in two phases. Its secondary windings 150 and 160 are star connected and supply the output voltage to a primary winding 37 of a transformer T4. Its secondary windings 38 and 39 are symmetrical and their midpoints are connected with the star point of the secondary winding 12 of the transformer T1. The voltage from windings 38 and 39 is full wave rectified by rectifiers 29 to 32 and smoothed by condensers 33 and 34, these giving the midpoint for connecting the third phase of the winding 12 to this arrangement, which represents the phase discriminator P3. The second presaturating winding 8 of the transformer T2 is connected across the condensers 33 and 34. The polarity of the winding 8 with regard to the polarity of the winding 28 is such that a flow of energy from the transformer T1 to the alternator increases the presaturation of the transformer T2 and herewith the coupling between primary windings 12 and secondary windings 2 of the transformer T1. The reversed flow of energy causes a looser coupling in the transformer T1.

The described control equipment behaves in the following manner:

From the start of prime mover M the alternator shaft is accelerated to idling speed. Tachometer generator T.G. supplies by winding 26 a very low voltage to the windings 10, 11 and 28. Oscillator O feeds into the winding 2 the magnetizing energy for transformer T1. When the prime mover drives the shaft through the synchronous speed of the alternator, the magnetic excitation of stator G1 is sufficiently high for an initial raise of alternator voltage. In the same instant the tachometer voltage has become high enough to energize the winding 11 so much that the coupling in the transformer T1 increases and an appreciable voltage is induced in the winding 2. This voltage produces the first current impulse of standard frequency in the alternator. Winding 28 as well as winding 11 have been energized and have increased the coupling in the transformer T2. An increase in capacitance of the alternator circuit results and the voltage level of the alternator builds up at the imposed frequency. The current impulse through the transformer T3 results in a strong positive presaturating impulse in winding 8 and causes a transient increase of capacitance. The build up of the voltage level is hereby accelerated. The capacitive current from transformer T2 to alternator G through transformer T$i$ causes a current impulse and a magnetic field in windings 18 and 19 which is opposed to the field of winding 28. The capacitance is lowered again, if the capacitive current was too high, and damage of the control equipment by overshoot and feedback to the oscillator is avoided.

The increasing alternator voltage level causes a decrease of presaturation of machine G1 by winding 10 and an increase of the alternator inductance which matches the decrease of capacitance. The presaturation in winding 11 decreases too and the coupling in transformer T1 between windings 2 and 12 becomes looser. The energy flow between oscillator and alternator is reduced to a minimum.

Under steady state conditions following behaviour of the control equipment is peculiar:

A decrease of load results in the first instant in a flow of energy from the generator to the oscillator. The correlated impulse from transformer T3 makes the coupling between the windings 6 and 7 in the transformer T2 looser. The capacitive energy decreases and adjusts so the magnetic energy of the alternator and hereby the voltage. The current through the transformer T3 degenerates.

An increase of load causes a reversed operation of the transformer T3.

An increase of load further causes by means of the transformer T$i$ an increased coupling between windings 6 and 7 in the transformer T2 and an increase of capacitive energy and of magnetic energy in the alternator and hereby of the voltage. A decrease of load causes a reversed operation of the transformer T$i$.

A change of alternator frequency results in the following control functions:

An increase of alternator frequency over the oscillator frequency causes an energy impulse of beat frequency from the alternator to the oscillator. The correlated voltage impulse from the transformer T3 is transformed by phase discriminator P3 into a negative current impulse through the winding 8 in the transformer T2. The coupling between the windings 6 and 7 becomes instantaneously looser and the capacitive, and consequently the magnetic energy decreases. The alternator voltage level is lowered and the presaturation of machine G1 by the winding 10 reduced. The inductivity of machine G1 increases and the resonant frequency of the circuit alternator-condenser bank is lowered to a value close to the oscillator frequency or immediately to this frequency.

A decrease in frequency causes similar but reversed functions of the control systems.

In the control system described, the current transformer T$i$ is connected as a part of the phase discriminator P$i$ but current transformer T3 feeds its control impulses into a separate transformer T4 of phase discriminator P3. This last feature makes it possible to use the control impulses for other purposes too, as will be described hereinafter. The transformer T3 can otherwise be used even in an analogous connecting scheme as transformer T$i$, i.e. as part of the phase discriminator P3.

The symmetrical windings 18 and 19 as well as can be replaced by one winding connected across two symmetrical capacitors as for instance used in discriminator P3 (condensers 33 and 34 together with winding 8).

The presaturation of transformer T1 by means of the difference of the tachometer voltage and the alternator voltage can be replaced by the difference of an appropriate portion of the tachometer voltage and the rectified output voltage of transformer T3. The coupling function of presaturating winding 11 is then stronger and faster and the oscillator is better protected against overload or feedback. The reference voltage from oscillator O has the character of a gliding voltage when tapped from winding 2 of transformer T1. The magnetic properties of transformer T2 can make it necessary to use a constant oscillator voltage as reference tapped from windings 12 of transformer T1.

Furthermore, the magnetic properties of transformer T2 can make it more opportune to replace the addition of the magnetic potentials of presaturating windings 8, 18, 19 and 28 by summing the respective winding voltages and feeding the resulting voltage into only one presaturating winding in transformer T2.

An example of the modifications lined out above, is given in Figs. 3 and 4.

Fig. 3 shows the basic arrangement of the control system when transformer T1 is presaturated by the voltage difference between tachometer voltage and the output voltage of transformer T3. The transformer T2 is presaturated through a single winding 8 by the sum of the output voltages of transformers T3 and T$i$ with the constant oscillator voltage as reference supplied from a common phase discriminator P.D. together with an appropriate portion of the rectified line voltage.

The secondary windings of transformers T3 and T$i$ are doubled to give a full wave rectification of the A.C. control voltages.

The complete wiring diagram in Fig. 4 shows the arrangement of the doubled secondary windings 22 and 22$a$ respectively 23 and 23$a$ in transformer T$i$ and of windings 150 and 150$a$ respectively 160 and 160$a$ in transformer T3. These four windings are connected in analogy to the four secondary windings of transformer T4 in Fig. 2 and their output voltage is, together with the constant oscillator voltage from primary winding 12 of transformer T1 rectified by rectifiers 29 to 32 and smoothed by condensers 33 and 34 with resistances 35 and 36 in parallel. Across these the resulting control voltage from transformers T3 and T$i$ is appearing and the appropriate portion of the rectified line voltage is added by connecting a tap contact of potentiometer 17 in series with resistances 35 and 36 and with presaturating winding 8 in the transformer T2 that is connected to the other (negative) pole of potentiometer 17.

The control equipment behaves in a similar manner as the equipment according to Fig. 2. The coupling of transformer T1 is faster and more sensitive than in the case of Fig. 2.

A further improvement is achieved by combining the oscillator with the condenser bank to a charging unit, which works through the transformer T2, together with the alternator and the load. The basic arrangement in Fig. 5 shows the oscillator O connected through a unidirectional saturable reactor T1 to condenser bank C and this through another unidirectional saturable reactor T2 connected to the bus-bar with load impedance Z. A current transformer T$i$ is connected between bus-bar and alternator G. The output voltage of transformer T$i$ is phase discriminated and rectified in a phase discriminator P.D. and fed together with the rectified line voltage into a control winding in reactor T2. The voltage drop of the gate windings in reactor T2 is rectified and phase discriminated by discriminator P.D.2 and fed into another control winding of T2. Reactor T1 is self saturating by its own voltage drop that is rectified and phase discriminated by discriminator P.D.1 and fed together with a constant adjustable voltage supplied from tachometer T.G. into the control winding of the reactor T1.

Tachometer generator T.G. supplies further the input for oscillator O.

Fig. 6 is the complete wiring diagram and shows the arrangement. The rectified tachometer voltage supplied by stator winding 26 through rectifier 13 is fed via a barretter 45 into a filter consisting of condensers 46, 47 and choke coil 48. The smoothed D.C. voltage is of constant value and is supplied to the oscillator as input voltage and to control winding 110 in reactor T1 for adjustment of the maximum load of the oscillator. Another control winding 11 in reactor T1 is supplied via rectifiers 49, 50 and smoothing condensers 51, 52 with the voltage drops through the gate windings of two phases of the reactor T1 that is phase discriminated by the third phase voltage. The reactor T1 is by the combined action of control windings 11 and 110 unidirectional and allows only for a flow of energy from the oscillator O to the condenser bank C within a certain output limit.

The two phase current transformer Ti supplies the output voltage of windings 22, 22a and 23, 23a to rectifiers 29, 30, 31, 32. The third phase voltage is added for phase discrimination and the rectified voltage is smoothed by condensers 33, 34 and resistances 35, 36 and added to an appropriate portion of the rectified line voltage from potentiometer 17. This voltage sum is fed into control winding 8 of reactor T2. The voltage drop through the gate windings 6 of two phases of reactor T2 is phase discriminated by the voltage of the third phase rectified by rectifiers 53, 54, smoothed by condensers 55, 56 and fed into control winding 7. The reactor T2 becomes by the combined action of control windings 11 and 110 unidirected and allows only for a flow of energy from condenser bank C to bus-bar or alternator.

When the alternator is to be started the tachometer voltage energizes oscillator O, control winding 110 in reactor T1 presaturating winding 10 in machine G1 and slightly through potentiometer 17 control winding 8 in reactor T2. The condenser bank C is charged by oscillator O to a voltage defined by the impedance of gate windings 6 of reactor T2. The small amount of capacitive energy in the condenser bank together with the magnetizing effect of the presaturating winding 10 in machine G1 are sufficient to initiate the alternator voltage when the rotor is running through synchronous to oversynchronous speed.

The normal voltage level is defined by the output voltage of the oscillator. A voltage drop by a load current in the bus-bar is compensated by the output voltage of current transformer T$i$ which energizes control winding 8 to a higher grade than in the no load state and lowers the impedance of windings 6. A higher current from the condenser bank results and the alternator voltage increases to the normal level.

This normal frequency level is defined by the oscillator frequency. A deviation of the alternator frequency from the oscillator frequency is not possible as the condenser bank C operates as charging unit and can be charged only from the oscillator O but not from alternator because of the unidirectional character of reactor T2.

It is to be understood that the detailed description and the accompanying drawings are illustrative and that improvements herein disclosed may be embodied in various forms of construction within the scope of this invention.

What is claimed is:

1. Control equipment for maintaining constant frequency in an induction alternator system comprising two series connected induction machines, said machines being mounted on a common shaft, the one machine saturable by the difference of the alternator voltage and a voltage proportional to the rotor speed, an oscillator of constant voltage governing the alternator voltage and frequency connected to the alternator, a saturable transformer and a current transformer connected in the circuit between the oscillator and alternator, a condenser bank connected to the alternator bus-bar, a second saturable transformer connected between the condenser bank and the alternator, a second current transformer connected between alternator and bus-bar, means for phase discrimination of the output voltages of said current transformers relative to the oscillator voltage, rectifying means for the phase discriminated voltage, the phase discriminated voltage being supplied to presaturating windings in said saturable transformers to control the capacitive current from condenser bank to alternator and the current between oscillator and alternator.

2. Control equipment in an induction alternator system according to claim 1, wherein the alternator voltage is used as phase reference voltage against the output voltage of the current transformer between the alternator and the bus-bar, this phase discriminated voltage being rectified and supplied to a first presaturating winding in the transformer between the condenser bank and the bus-bar, the oscillator voltage being used as phase reference voltage against the output voltage of the current transformer between the alternator and the bus-bar, this phase discriminated voltage being rectified and supplied to a second presaturating winding in said transformer, a third presaturating winding in said transformer supplied with the rectified alternator voltage.

3. Control equipment in an induction alternator system according to claim 2, wherein only the oscillator voltage is used as phase reference voltage in the current transformer between the alternator and the oscillator and in the current transformer between the alternator and the bus-bar.

4. Control equipment in an induction alternator system according to claim 1, wherein the output voltages of the current transformer between the alternator and the oscillator and of the current transformer between the alternator and the bus-bar are connected in series, against the oscillator voltage as phase reference voltage, the phase discriminated voltage being connected in series with an appropriate portion of the rectified alternator voltage and supplying the resulting voltage to a single presaturating winding in the transformer between the condenser bank and the bus-bar.

5. Control equipment in an induction alternator system according to claim 1, wherein the difference of the alternator voltage and of a voltage proportional to the rotor speed is used to saturate the transformer between the alternator and the oscillator.

No references cited.